(12) United States Patent
Lehar

(10) Patent No.: US 8,490,397 B2
(45) Date of Patent: Jul. 23, 2013

(54) COMPOUND CLOSED-LOOP HEAT CYCLE SYSTEM FOR RECOVERING WASTE HEAT AND METHOD THEREOF

(75) Inventor: Matthew Alexander Lehar, Munich (DE)

(73) Assignee: General Electric Company, Niskayuna, NY (US)

( * ) Notice: Subject to any disclaimer, the term of this patent is extended or adjusted under 35 U.S.C. 154(b) by 654 days.

(21) Appl. No.: 12/618,958

(22) Filed: Nov. 16, 2009

(65) Prior Publication Data
US 2011/0113780 A1  May 19, 2011

(51) Int. Cl.
 F01K 25/08 (2006.01)
 F01K 7/34 (2006.01)
 F01K 25/06 (2006.01)
 F01K 27/00 (2006.01)

(52) U.S. Cl.
 USPC .............. 60/651; 60/673; 60/653; 60/643

(58) Field of Classification Search
 USPC .............. 60/651, 673, 653, 641, 694, 378
 See application file for complete search history.

(56) References Cited

U.S. PATENT DOCUMENTS

| | | | | |
|---|---|---|---|---|
| 4,358,930 A | * | 11/1982 | Pope et al. | 60/647 |
| 4,573,321 A | * | 3/1986 | Knaebel | 60/649 |
| 5,317,904 A | * | 6/1994 | Bronicki | 62/87 |
| 5,799,490 A | * | 9/1998 | Bronicki et al. | 60/655 |
| 7,340,897 B2 | * | 3/2008 | Zimron et al. | 60/641.1 |
| 2004/0003592 A1 | * | 1/2004 | Viteri et al. | 60/651 |
| 2004/0265651 A1 | | 12/2004 | Steinberg | |
| 2007/0163261 A1 | * | 7/2007 | Strathman | 60/651 |
| 2007/0280400 A1 | | 12/2007 | Keller | |

FOREIGN PATENT DOCUMENTS

| | | |
|---|---|---|
| EP | 1930587 A2 | 11/2009 |
| JP | 2007291869 A | 11/2007 |

OTHER PUBLICATIONS

Closed Brayton Cycle Waste Fuel Power Cogeneration System, Pastell et al, Proceedings of the 20th Intersociety Energy Conversion Engineering Conference, SAE P-164, vol. 2 of Three Volumes, Aug. 1985.*

Won J. Kim, Tae W. Kim, Myoung S. Sohn, Kune Y. Suh; "Supercritical Carbon Dioxide Brayton Power Conversion Cycle Design for Optimized Battery-Type Integral Reactor System"; Proceedings of the 2006 international congress on advances in nuclear power plants—ICAPP'06, Paper 6142; pp. 780-786.

* cited by examiner

*Primary Examiner* — Kenneth Bomberg
*Assistant Examiner* — Deming Wan
(74) *Attorney, Agent, or Firm* — Andrew J. Caruso

(57) ABSTRACT

A waste heat recovery system includes a Brayton cycle system having an heater configured to circulate carbon dioxide vapor in heat exchange relationship with a hot fluid to heat carbon dioxide vapor. A Rankine cycle system is coupled to the Brayton cycle system and configured to circulate a working fluid in heat exchange relationship with the carbon dioxide vapor to heat the working fluid.

12 Claims, 3 Drawing Sheets

COMPOUND CLOSED-LOOP HEAT CYCLE SYSTEM FOR RECOVERING WASTE HEAT AND METHOD THEREOF

BACKGROUND

The embodiments disclosed herein relate generally to the field of heat cycle system for recovering waste heat, and more particularly, to a compound closed-loop heat cycle system having a Brayton top cycle and a Rankine bottom cycle for recovering waste heat, and method thereof.

Enormous amounts of waste heat are generated by a wide variety of industrial and commercial processes and operations. Example sources of waste heat include heat from space heating assemblies, steam boilers, engines, and cooling systems. The term "waste heat" encompasses any supply of residual heat given off by a primary processes that is not conventionally exploited as a source of energy.

Some power generation systems provide better reliability and off-grid operation with alternative fuels such as biogas or landfill gas, with examples being gas turbines and combustion engines such as microturbines and reciprocating engines. Combustion engines may be used to generate electricity using fuels such as gasoline, natural gas, biogas, plant oil, and diesel fuel. However, atmospheric pollutants such as nitrogen oxides and particulates may be emitted.

One method to generate electricity from the waste heat of a combustion engine without increasing emissions is to apply a bottoming steam Rankine cycle. A Rankine cycle typically includes a turbo generator, an evaporator/boiler, a condenser, and a liquid pump. However, water-based steam Rankine cycles are not attractive in the aforementioned low temperature waste heat region due to high cost and low efficiency. The performance of an organic Rankine cycle (ORC) is limited by constraints of the working fluid circulated within the ORC. Steam used as a working fluid may be optimal only for a specific range of cycle temperatures and pressures. This conventional steam Rankine bottoming cycle requires condensation at relatively low pressure, implying large low-pressure turbine and condenser volumes. Hence installation of conventional bottoming steam Rankine cycle system is disproportionately bulky, and complex considering the relatively small yield derived from low-temperature waste heat. The low pressure of the steam condensation introduces other complexities, such as the need for special de-aeration units to remove atmospheric air that leaks into the sub-atmospheric pressure vessels from the outside.

It would be desirable to have a simple system and method that effectively recovers waste heat and that is not limited by constraints of a steam working fluid circulated within a Rankine cycle system.

BRIEF DESCRIPTION

In accordance with one exemplary embodiment of the present invention, a waste heat recovery system is disclosed. The waste heat recovery system includes a Brayton cycle system having a heater configured to circulate carbon dioxide vapor in heat exchange relationship with a hot fluid to heat carbon dioxide vapor. A Rankine cycle system is coupled to the Brayton cycle system and configured to circulate a working fluid in heat exchange relationship with the carbon dioxide vapor to heat the working fluid.

In accordance with another exemplary embodiment of the present invention, a method of operating the waste heat recovery system is disclosed.

In accordance with one exemplary embodiment of the present invention, a waste heat recovery system is disclosed. The waste heat recovery system includes a Brayton cycle system having a heater configured to circulate carbon dioxide vapor in heat exchange relationship with a hot fluid from a heat source to heat carbon dioxide vapor. A Rankine cycle system is coupled to the Brayton cycle system and configured to circulate a working fluid in heat exchange relationship with the carbon dioxide vapor and the hot fluid to heat the working fluid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with the embodiment discussed herein, a waste heat recovery system is disclosed. The exemplary system includes a Brayton cycle system (top cycle) having a heater configured to circulate carbon dioxide vapor in heat exchange relationship with a hot fluid to heat carbon dioxide vapor. A Rankine cycle system (bottom cycle) is coupled to the Brayton cycle system and configured to circulate a working fluid in heat exchange relationship with the carbon dioxide vapor to heat the working fluid. In accordance with the exemplary embodiment of the present invention, the exemplary waste heat recovery system is integrated with heat sources to allow a higher efficiency recovery of waste heat for generation of electricity. The heat sources may include combustion engines, gas turbines, geothermal, solar thermal, industrial and residential heat sources, or the like.

Figure 1:
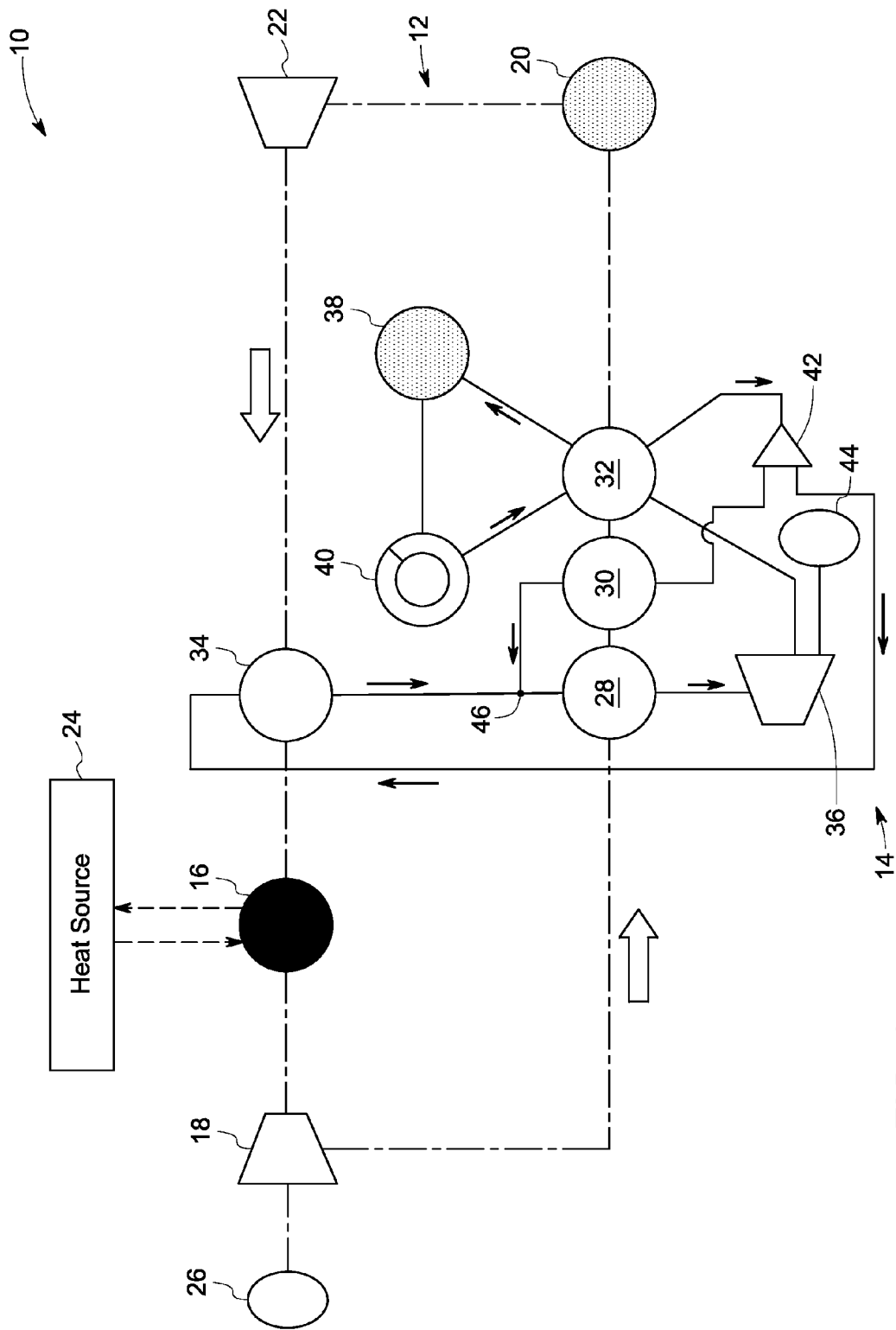
FIG. 1 is a diagrammatical representation of a waste heat recovery system having a Brayton cycle system and a Rankine cycle system in accordance with an exemplary embodiment of the present invention.

Referring to FIG. 1, a waste heat recovery system 10 is illustrated in accordance with an exemplary embodiment of the present invention. The system 10 includes a Brayton cycle system (top cycle) 12 coupled to a Rankine cycle system (bottom cycle) 14. In the illustrated embodiment, the Brayton cycle system 12 includes a heater 16, a first turbine 18, a cooler 20, and a compressor 22. Carbon dioxide vapor is circulated through the Brayton cycle system 12.

The heater 16 is coupled to a heat source 24, for example an exhaust unit of a heat generation system (for example, an engine). The heater 16 receives heat from a hot fluid e.g. an exhaust gas generated from the heat source and heats carbon dioxide so as to heat carbon dioxide vapor. In one specific embodiment, the carbon dioxide vapor from the heater 16 may be at a temperature of about 490 degrees Celsius and at a pressure of about 200 bar. Carbon dioxide vapor is passed through the first turbine 18 to expand the carbon dioxide vapor and to drive a first generator 26 configured to generate electric power. In a specific embodiment, the carbon dioxide vapor from the first turbine 18 may be at a temperature of about 320 degrees Celsius and a pressure of about 40 bar.

In the illustrated embodiment, the usage of carbon dioxide as the working fluid has the advantage of being non-flammable, non-corrosive, non-toxic, and able to withstand high cycle temperatures (for example above 400 degrees celsius). In one embodiment as described above, carbon dioxide may be heated super critically to high temperatures without risk of chemical decomposition.

In the illustrated embodiment, the Rankine cycle system 14 includes a first heat exchanger 28, a second heat exchanger 30, a third heat exchanger 32, and a fourth heat exchanger 34. A working fluid, for example a hydrocarbon fluid is circulated through the Rankine cycle system 14. In a more specific embodiment, the working fluid may include an organic working fluid. The organic working fluid may include propane, butane, pentafluoro-propane, pentafluoro-butane, pentafluoro-polyether, oil, or combinations thereof. It should be noted herein that that list of organic working fluids is not inclusive and other organic working fluids applicable to organic Rankine cycles are also envisaged. Carbon dioxide vapor from the first turbine 18 is circulated in heat exchange relationship with the vaporized working fluid sequentially via the first heat exchanger 28, the second heat exchanger 30, and the third heat exchanger 32 to heat the working fluid. In a specific embodiment, the carbon dioxide vapor at the exit of the third heat exchanger 32 is at a temperature of 85 degrees Celsius and at a pressure of 40 bar. The carbon dioxide from the third heat exchanger 32 is fed through the cooler 20 to cool the carbon dioxide vapor. The cooled carbon dioxide vapor is then compressed to a substantially higher pressure via the compressor 22. In one embodiment, the carbon dioxide vapor from the compressor 22 is at a temperature of about 210 degrees Celsius and a pressure of about 200 bar. In one embodiment, the compressor 22 may be a multi-stage compressor with an intercooler disposed between each stage of the multi-stage compressor.

The compressed carbon dioxide vapor from the compressor 22 is circulated in heat exchange relationship with the working fluid via the fourth heat exchanger 34 so as to heat the vaporized working fluid, to reduce the temperature of the carbon dioxide vapor sufficiently, to absorb heat at temperatures as low as, for example, 120 degrees celsius from the waste heat source 24. This facilitates maximum extraction of heat from the waste heat source 24. In a specific embodiment, the vaporized working fluid from the fourth heat exchanger 34 may be at a temperature of about 170 degrees Celsius and at a pressure of about 60 bar. In other words, the vaporized working fluid is in a supercritical state. The cycle is repeated in the Brayton cycle system 12. The vaporized working fluid from the fourth heat exchanger 34 is then fed through the first heat exchanger 28 in heat exchange relationship with the carbon dioxide vapor to further heat the vaporized working fluid. In one embodiment, the vaporized working fluid at the exit of the first heat exchanger 28 is at a temperature of about 205 degrees Celsius and a pressure of about 60 bar.

The Rankine cycle system 14 further includes a second turbine 36, a condenser 38, a pump 40, and a flow splitter device 42. The vaporized working fluid is passed through the second turbine 36 to expand the vaporized working fluid and to drive a second generator 44 configured to generate electric power. In a specific embodiment, the working fluid from the second turbine is at a temperature of about 105 degrees Celsius and at a pressure of about 5 bar. The second turbine 36 may be axial type expander, impulse type expander, or high temperature screw type expander, radial-inflow turbine type of expander. In other words, the vaporized working fluid is a subcritical state. The expanded vaporized working fluid from the second turbine 36 is fed through the third heat exchanger 32 in heat exchange relationship with the carbon dioxide vapor. In one embodiment, the vaporized working fluid from the third heat exchanger 32 is at a temperature of about 65 degrees Celsius and at a pressure of about 5 bar.

After passing through the second turbine 36, the vaporized working fluid is passed through the third heat exchanger 32 to the condenser 38. The vaporized working fluid is condensed into a liquid, so as to generate a condensed working fluid. In a specific embodiment, the condensed working fluid is at a temperature of about 50 degrees Celsius and at a pressure of about 5 bar. The condensed working fluid is then pumped at a relatively higher pressure using a pump 40 through the third heat exchanger 32 to the flow splitter device 42. The pressurization and reheating of the working fluid results in gradual phase change from liquid state to vapor state. In a specific embodiment, the working fluid at the exit of the third heat exchanger is at a temperature of about 100 degrees Celsius and at a pressure of about 60 bar.

In the illustrated embodiment, the flow splitter device 42 divides the flow of the working fluid from the third heat exchanger 32 into two portions. The flow splitter device 42 is configured to feed one portion of the vaporized working fluid from the third heat exchanger 32 to the fourth heat exchanger 34 and another portion of the vaporized working fluid from the third heat exchanger 32 to a point 46 upstream of the first heat exchanger 28. The other portion of the vaporized working fluid from the third heat exchanger 32 is mixed with the vaporized working fluid fed from the fourth heat exchanger 34 to the first heat exchanger 28. The cycle is repeated in the Rankine cycle system 14.

In the illustrated embodiment, there are a plurality of instances of heat exchange (may also be referred to as "intracycle" transfers of heat) between carbon dioxide vapor and the vaporized working fluid. This exchange of heat between the carbon dioxide vapor and the vaporized working fluid via the heat exchangers 28, 30, 32, and 34. This exchange of heat serves to boil (if the working fluid is at sub-critical temperature) or otherwise increase the enthalpy (if the working fluid is at supercritical temperature) of the working fluid in the Rankine cycle system 14.

In accordance with the embodiment discussed herein, in the Brayton cycle system 12, carbon dioxide is heated directly (without transferring heat through an intermediate fluid) by a waste heat source. Carbon dioxide vapor is expanded to produce electric power. The heat from carbon dioxide vapor is transferred to the hydrocarbon fluid circulated in the Rankine cycle system 14 through a series of heat exchangers 28, 30, 32, and 34. Carbon dioxide is circulated in the vapor state in the Brayton cycle system 12, while in the Rankine cycle system 14; the hydrocarbon fluid is cooled and condensed to a liquid phase before re-pressurization and heating.

As discussed above, usage of carbon dioxide as a working fluid in the Brayton cycle system 12 has the advantage that carbon dioxide would remain inert even at substantially higher temperatures, for example in the range to 300-600 degrees Celsius. Also, carbon dioxide does not suffer significant chemical decomposition at higher temperatures facilitating higher system efficiency. The exemplary system 10 operates at substantially higher pressures, for example, 70-200 bar. Hence the system 10 is compact and simple. The cycle fluid remains pure and do not require the de-aerating units typical of steam plants. The combination of a Brayton cycle system operating with carbon dioxide as a process fluid and a Rankine cycle system effectively extracts heat from a high-temperature heat source and at the same time efficiently convert the residual low-temperature heat to electrical energy.

Figure 2:
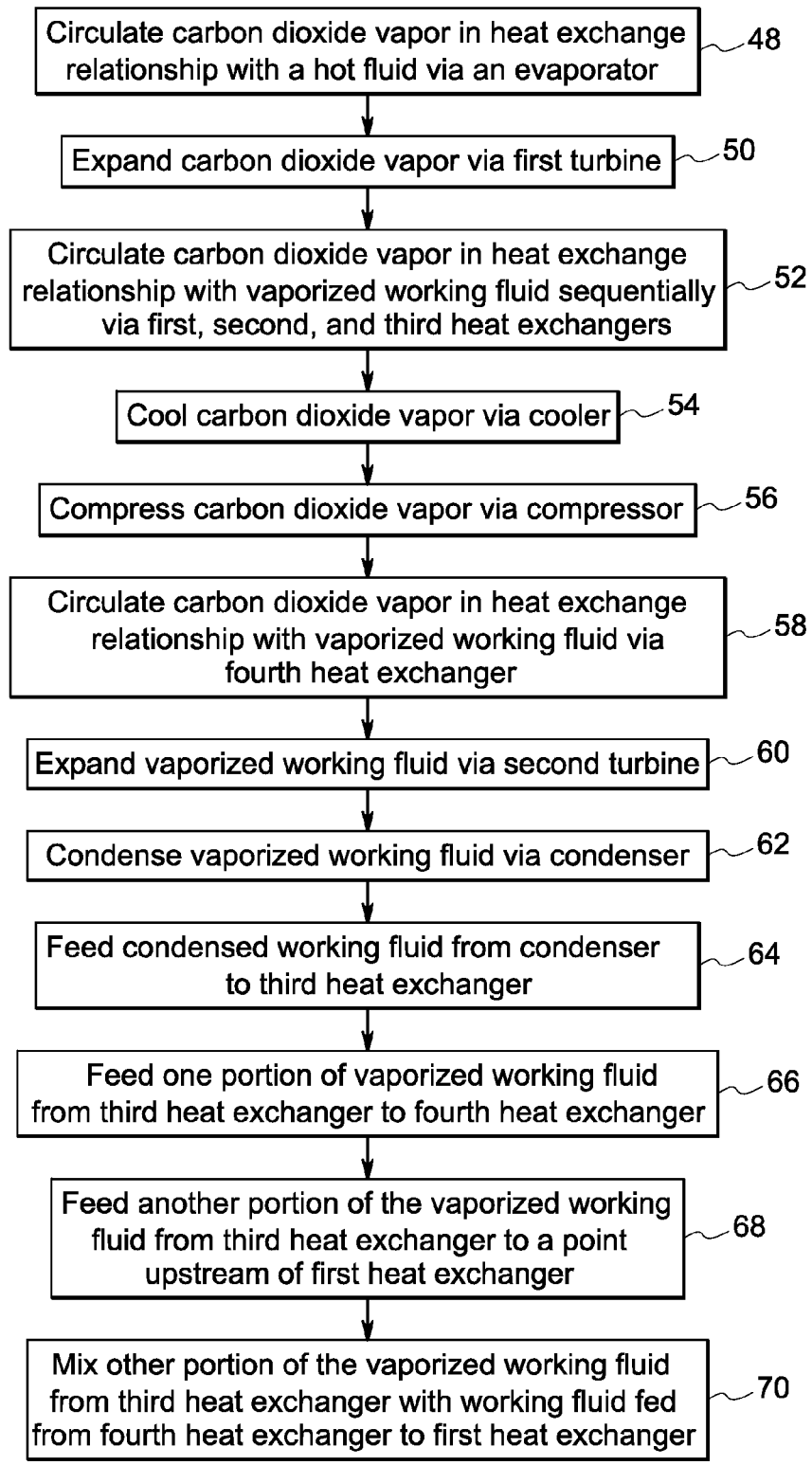
FIG. 2 is a flow chart illustrating exemplary steps involved in method of operating the waste heat recovery system in accordance with an exemplary embodiment of the present invention.

Referring to FIG. 2, a flow chart illustrating exemplary steps involved in method of operating the waste heat recovery system 10 is disclosed. The method involves circulating carbon dioxide vapor in heat exchange relationship with a hot fluid via the heater 16 of the Brayton cycle system 12 as represented by the step 48. The heater 16 receives heat from a hot fluid e.g. an exhaust gas generated from the heat source and heats carbon dioxide so as to heat carbon dioxide vapor. The carbon dioxide vapor is passed through the first turbine 18 to expand the carbon dioxide vapor as represented by the step 50. In other words, carbon dioxide vapor is passed through the first turbine 18 to expand the carbon dioxide vapor and to drive the first generator 26 configured to generate electric power.

Carbon dioxide vapor from the first turbine 18 is circulated in heat exchange relationship with the vaporized working fluid sequentially via the first heat exchanger 28, the second heat exchanger 30, and the third heat exchanger 32 of the Rankine cycle system 14 to heat the working fluid as represented by the step 52. The carbon dioxide from the third heat exchanger 32 is fed through the cooler 20 to cool the carbon dioxide vapor as represented by the step 54. The cooled carbon dioxide vapor is then compressed to a substantially higher pressure via the compressor 22 as represented by the step 56. The compressed carbon dioxide vapor from the compressor 22 is then circulated in heat exchange relationship with the vaporized working fluid via the fourth heat exchanger 34 so as to heat the vaporized working fluid as represented by the step 58. The cycle is repeated in the Brayton cycle system 12.

The vaporized working fluid from the fourth heat exchanger 34 is then fed through the first heat exchanger 28 in heat exchange relationship with the carbon dioxide vapor to further heat the vaporized working fluid. The vaporized working fluid is passed through the second turbine 36 of the Rankine cycle system 14 to expand the vaporized working fluid and to drive the second generator 44 configured to generate electric power as represented by the step 60. The expanded vaporized working fluid from the second turbine 36 is fed through the third heat exchanger 32 in heat exchange relationship with the carbon dioxide vapor.

After passing through the second turbine 36, the vaporized working fluid is passed through the third heat exchanger 32 to the condenser 38 as represented by the step 62. The vaporized working fluid is condensed into a liquid, so as to generate a condensed working fluid. The condensed working fluid is then pumped at a relatively higher pressure using a pump 40 through the third heat exchanger 32 to the flow splitter device 42 as represented by the step 64. The pressurization and reheating of the working fluid results in gradual phase change from liquid state to vapor state.

In the illustrated embodiment, the flow splitter device 42 divides the flow of the working fluid from the third heat exchanger 32 into two portions. The method includes feeding one portion of the vaporized working fluid from the third heat exchanger 32 to the fourth heat exchanger 34 as represented by the step 66. The method further includes feeding another portion of the vaporized working fluid from the third heat exchanger 32 to a point 46 upstream of the first heat exchanger 28 as represented by the step 68. The other portion of the vaporized working fluid from the third heat exchanger 32 is mixed with the vaporized working fluid fed from the fourth heat exchanger 34 to the first heat exchanger 28 as represented by the step 70. The cycle is repeated in the Rankine cycle system 14.

Figure 3:
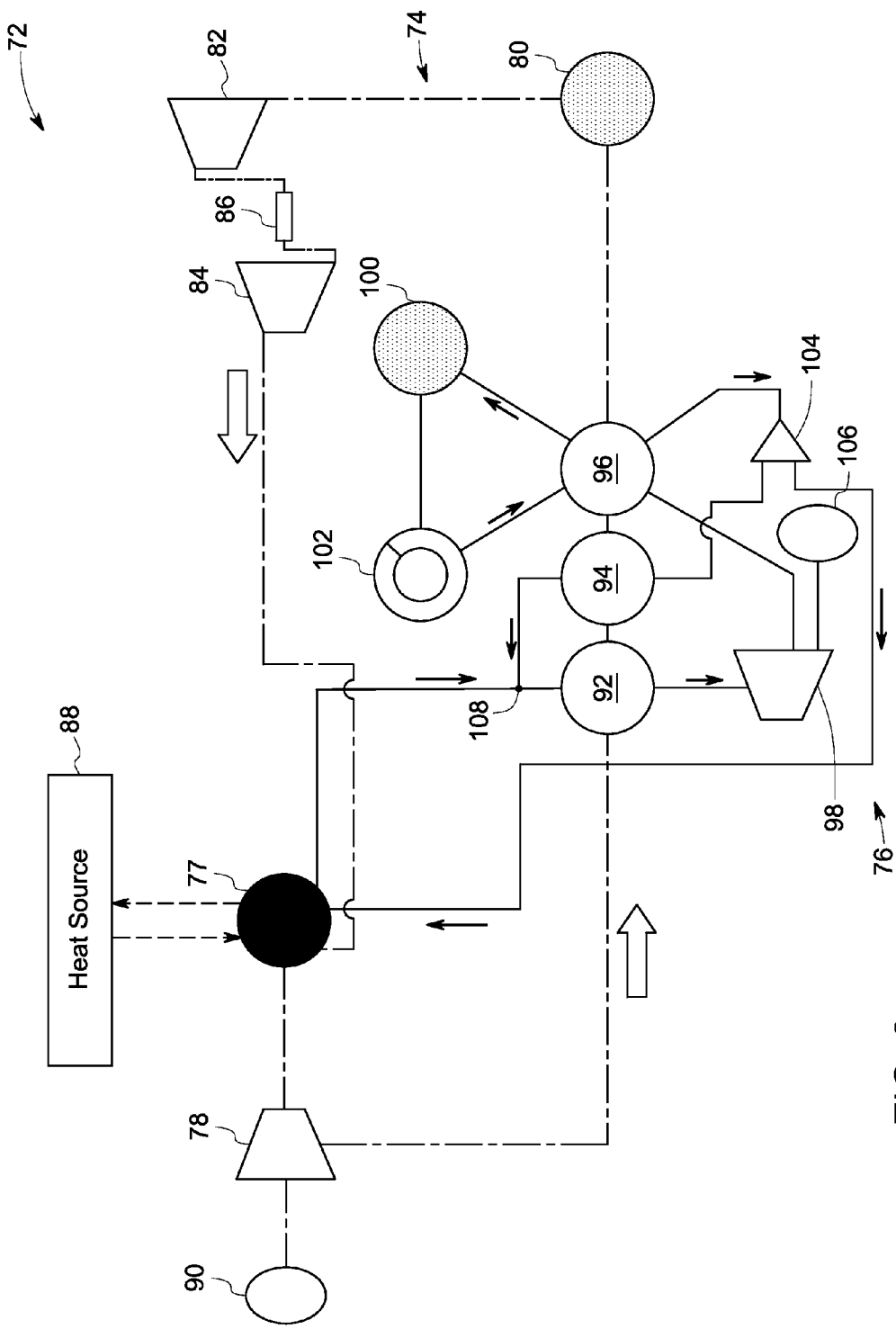
FIG. 3 is a diagrammatical representation of a waste heat recovery system having a Brayton cycle system and a Rankine cycle system in accordance with an exemplary embodiment of the present invention.

Referring to FIG. 3, a waste heat recovery system 72 is illustrated in accordance with an exemplary embodiment of the present invention. The system 72 includes a Brayton cycle system (top cycle) 74 coupled to a Rankine cycle system (bottom cycle) 76. In the illustrated embodiment, the Brayton cycle system 74 includes a heater 77, a turbine 78, a cooler 80, a first compressor stage 82, a second compressor stage 84, and an intercooler 86 disposed between the first compressor stage 82 and the second compressor stage 84. Carbon dioxide vapor is circulated through the Brayton cycle system 74.

The heater 77 is coupled to a heat source 88, for example an exhaust unit of a heat generation system (for example, an engine). The heater 77 receives heat from a hot fluid e.g. an exhaust gas generated from the heat source and heats carbon dioxide so as to heat carbon dioxide vapor. Carbon dioxide vapor is passed through the turbine 78 to expand the carbon dioxide vapor and to drive a generator 90 configured to generate electric power.

In the illustrated embodiment, the Rankine cycle system 76 includes a plurality of heat exchangers 92, 94, 96. A working fluid, for example a hydrocarbon fluid is circulated through the Rankine cycle system 76. Carbon dioxide vapor from the turbine 78 is circulated in heat exchange relationship with the vaporized working fluid sequentially via the heat exchangers 92, 94, 96 to heat the working fluid. The carbon dioxide from the heat exchanger 96 is fed through the cooler 80 to cool the carbon dioxide vapor. The cooled carbon dioxide vapor is then compressed to substantially higher pressures via the first compressor stage 82 and the second compressor stage 84. The carbon dioxide vapor from the first compressor stage 82 is cooled via the intercooler 86 and then fed to the second compressor stage 84.

The compressed carbon dioxide vapor from the second compressor stage 84 is circulated in heat exchange relationship with the hot fluid from the heat source 88 via the heater 77 so as to heat the carbon dioxide vapor. Heat imparted to the carbon dioxide vapor stream by each compression stage might be removed through cooling by either the vaporized working fluid or the ambient air, in order to reduce the investment of energy required to drive the compressor. The cycle is repeated in the Brayton cycle system 12.

In the illustrated embodiment, the vaporized working fluid from the rankine cycle system 76 is also circulated in heat exchange relationship with the hot fluid from the heat source 88 via the heater 77 to heat the vaporized working fluid. In other words, heat from the heat source 88 is used to heat both the carbon dioxide vapor and the vaporized working fluid via the heater 77. To be more specific, heat from the heat source 88 is used to first heat carbon dioxide vapor and then heat the vaporized working fluid.

The Rankine cycle system 76 further includes a turbine 98, a condenser 100, a pump 102, and a flow splitter device 104. The vaporized working fluid is passed through the turbine 98 to expand the vaporized working fluid and to drive a generator 106 configured to generate electric power. The expanded vaporized working fluid from the turbine 98 is fed through the heat exchanger 96 in heat exchange relationship with the returning stream of condensed working fluid from the pump 102.

After passing through the turbine 98, the vaporized working fluid is passed through the heat exchanger 96 to the condenser 100. The vaporized working fluid is condensed into a liquid, so as to generate a condensed working fluid. The condensed working fluid is then pumped at a relatively higher pressure using the pump 102 through the third heat exchanger 96 to the flow splitter device 104. The pressurized liquid working fluid from pump 102 is heated within heat exchanger 96, first by the expanded working fluid vapor stream entering heat exchanger 96 from turbine 98, and then by the carbon dioxide vapor stream that also passes through heat exchanger 96. The pressurization and reheating of the working fluid results in gradual phase change from liquid state to vapor state.

In the illustrated embodiment, the flow splitter device 104 divides the flow of the working fluid from the third heat exchanger 96 into two portions. The flow splitter device 104 is configured to feed one portion of the vaporized working fluid from the third heat exchanger 96 to the heater 77 and another portion of the vaporized working fluid from the heat exchanger 96 fed through the heat exchanger 94, is supplied to a point 108 upstream of the heat exchanger 92. The working fluid is further heated by the carbon dioxide vapor stream. The latter portion of the vaporized working fluid from the heat exchanger 96 is mixed at point 108 with the vaporized working fluid fed from the heater 77 to the heat exchanger 92. The cycle is repeated in the Rankine cycle system 76.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A waste heat recovery system, comprising:
   a Brayton cycle system comprising:
      a heater configured to circulate carbon dioxide vapor in heat exchange relationship with a hot fluid to heat the carbon dioxide vapor;
      a first turbine coupled to the heater and configured to expand the carbon dioxide vapor;
      a cooler; and
      a compressor configured to compress the carbon dioxide vapor fed through the cooler; and
   a Rankine cycle system coupled to the Brayton cycle system; wherein the Rankine system comprises:
      a first heat exchanger, a second heat exchanger, and a third heat exchanger, wherein the carbon dioxide vapor from the first turbine is circulated in heat exchange relationship with a vaporized working fluid sequentially via the first heat exchanger, the second heat exchanger, and the third heat exchanger to heat the working fluid; wherein the cooler is configured to cool the carbon dioxide vapor fed through the first heat exchanger, the second heat exchanger, and the third heat exchanger;
      a fourth heat exchanger configured to circulate the vaporized working fluid in heat exchange relationship with the carbon dioxide vapor fed from the compressor so as to heat the working fluid
      a second turbine configured to expand the vaporized working fluid fed from the fourth heat exchanger via the first heat exchanger; and
      a condenser configured to condense the vaporized working fluid fed from the second turbine via the third heat exchanger.

2. The system of claim 1, wherein the Brayton cycle system comprises a first generator coupled to the first turbine and configured to generate power.

3. The system of claim 1, wherein the Rankine cycle system comprises a second generator coupled to the second turbine and configured to generate power.

4. The system of claim 1, wherein the Rankine cycle system comprises a pump configured to pressurize and feed the condensed working fluid from the condenser to the third heat exchanger to vaporize the condensed working fluid.

5. The system of claim 4, wherein a Rankine cycle system comprises a flow splitter device configured to feed one portion of the vaporized working fluid from the third heat exchanger to the fourth heat exchanger and another portion of the vaporized working fluid from the third heat exchanger to a point upstream of the first heat exchanger; wherein the other portion of the vaporized working fluid from the third heat exchanger is mixed with the vaporized working fluid fed from the fourth heat exchanger to the first heat exchanger.

6. The system of the claim 1, wherein the working fluid comprises a hydrocarbon.

7. A method comprising:
   circulating carbon dioxide vapor in heat exchange relationship with a hot fluid to heat the carbon dioxide vapor via an heater of a Brayton cycle system;
   expanding the carbon dioxide vapor via a first turbine coupled to the heater of the Brayton cycle system;
   circulating the carbon dioxide vapor from the first turbine in heat exchange relationship with a vaporized working fluid sequentially via a first heat exchanger, a second heat exchanger, and a third heat exchanger of the Rankine cycle system to heat the vaporized working fluid;
   cooling the carbon dioxide vapor fed through the first heat exchanger, the second heat exchanger, and the third heat exchanger via a cooler of the Brayton cycle system;
   compressing the carbon dioxide vapor fed through the cooler via a compressor of the Brayton cycle system;
   circulating the vaporized working fluid in heat exchange relationship with the carbon dioxide vapor fed from the compressor so as to heat the vaporized working fluid via a fourth heat exchanger of the Rankine cycle system
   expanding the vaporized working fluid fed through the fourth heat exchanger, the first heat exchanger via a second turbine of the Rankine cycle system; and
   condensing the vaporized working fluid fed from the second turbine via the third heat exchanger, using a condenser of the Rankine cycle system.

8. The method of claim 7, further comprising generating power via a first generator coupled to the first turbine of the Brayton cycle system.

9. The method of claim 7, further comprising generating power via a second generator coupled to the second turbine of the Rankine cycle system.

10. The method of claim 7, further comprising pressurizing and feeding the condensed working fluid from the condenser to the third heat exchange via a pump of the Rankine cycle system.

11. The method of claim 10, further comprising feeding one portion of the vaporized working fluid from the third heat exchanger to the fourth heat exchanger and another portion of the vaporized working fluid from the third heat exchanger to a point upstream of the first heat exchanger via a flow splitter device of the Rankine cycle system.

12. The method of claim 11, further comprising mixing the other portion of the vaporized working fluid from the third heat exchanger with the vaporized working fluid fed from the fourth heat exchanger to the first heat exchanger.

* * * * *